United States Patent
Papajewski et al.

(10) Patent No.: US 8,768,536 B2
(45) Date of Patent: Jul. 1, 2014

(54) METHOD FOR DETERMINING THE DRIVING RESISTANCE OF A VEHICLE

(75) Inventors: Jens Papajewski, Unterhausen (DE); Christian Wilhelm, Kösching (DE); Kostyantyn Bass, Kassel (DE)

(73) Assignee: Audi AG, Ingolstadt (DE)

( * ) Notice: Subject to any disclaimer, the term of this patent is extended or adjusted under 35 U.S.C. 154(b) by 0 days.

(21) Appl. No.: 14/002,903

(22) PCT Filed: Nov. 17, 2011

(86) PCT No.: PCT/EP2011/005798
§ 371 (c)(1),
(2), (4) Date: Sep. 3, 2013

(87) PCT Pub. No.: WO2012/119621
PCT Pub. Date: Sep. 13, 2012

(65) Prior Publication Data
US 2013/0345902 A1    Dec. 26, 2013

(30) Foreign Application Priority Data
Mar. 4, 2011 (DE) .......................... 10 2011 013 022

(51) Int. Cl.
*B60W 40/10* (2012.01)
*G06F 19/00* (2011.01)

(52) U.S. Cl.
USPC .................................................. 701/1; 701/80

(58) Field of Classification Search
CPC ... B60W 40/10; B60W 40/13; B60W 50/087; B60W 2040/13; B60W 2530/10; B60W 2530/16; B60W 30/18
USPC ................................................. 701/1, 67, 104
See application file for complete search history.

(56) References Cited

U.S. PATENT DOCUMENTS

| | | | |
|---|---|---|---|
| 6,219,607 | B1 | 4/2001 | Piepenbrink et al. |
| 6,236,928 | B1 | 5/2001 | Löffler et al. |
| 6,314,383 | B1 | 11/2001 | Leimbach et al. |
| 7,499,784 | B2 | 3/2009 | Kresse |
| 7,833,127 | B2 | 11/2010 | Petzold et al. |
| 8,068,964 | B2 | 11/2011 | Wolfgang et al. |
| 8,401,757 | B2 | 3/2013 | Tokimasa et al. |

(Continued)

FOREIGN PATENT DOCUMENTS

| | | |
|---|---|---|
| DE | 197 28 867 | 1/1999 |
| DE | 197 43 059 | 4/1999 |

(Continued)

OTHER PUBLICATIONS

International Search Report issued by the European Patent Office in International Application PCT/EP2011/005798 on Apr. 5, 2012.

*Primary Examiner* — Tan Q Nguyen
(74) *Attorney, Agent, or Firm* — Henry M Feiereisen LLC

(57) ABSTRACT

A method for determining the driving resistance of a vehicle by taking into account a value for the vehicle mass is described. Before beginning to drive, the vehicle mass and driving resistance coefficients are estimated with an estimation method by taking into account sensor signals, and an initial value for the driving resistance is calculated from the vehicle mass and the driving resistance coefficients. A corrected value for the driving resistance and the vehicle mass is calculated while driving, based on measured driving-related values, which are measured in chronological succession.

7 Claims, 2 Drawing Sheets

(56) References Cited

U.S. PATENT DOCUMENTS

| | | | |
|---|---|---|---|
| 2001/0005805 A1* | 6/2001 | Saotome et al. | 701/67 |
| 2004/0181317 A1* | 9/2004 | Flechtner et al. | 701/1 |
| 2010/0114437 A1 | 5/2010 | Boss et al. | |

FOREIGN PATENT DOCUMENTS

| | | |
|---|---|---|
| DE | 198 47 205 | 4/2000 |
| DE | 101 48 091 | 4/2003 |
| DE | 101 48 096 | 4/2003 |
| DE | 102 29 036 | 1/2004 |
| DE | 102 35 563 | 2/2004 |
| DE | 103 31 754 | 2/2005 |
| DE | 102004015966 | 10/2005 |
| DE | 102004023580 | 12/2005 |
| DE | 601 13 226 | 10/2006 |
| DE | 102006022170 | 1/2008 |
| DE | 102006029366 | 1/2008 |
| DE | 102006037704 | 2/2008 |
| DE | 102007019729 | 10/2008 |
| DE | 102008017348 | 10/2008 |
| DE | 102009056130 | 7/2010 |

* cited by examiner

METHOD FOR DETERMINING THE DRIVING RESISTANCE OF A VEHICLE

CROSS-REFERENCES TO RELATED APPLICATIONS

This application is the U.S. National Stage of International Application No. PCT/EP2011/005798, filed Nov. 17, 2011, which designated the United States and has been published as International Publication No. WO 2012/119621 and which claims the priority of German Patent Application, Serial No. 10 2011 013 022.5, filed Mar. 4, 2011, pursuant to 35 U.S.C. 119(a) -(d).

BACKGROUND OF THE INVENTION

The invention relates to a method for determining the driving resistance of a vehicle.

Due to dwindling resources and simultaneously increasing environmental awareness, it is increasingly important to develop as much as possible environmentally friendly vehicles. Very low emission levels can be achieved with hybrid vehicles that are equipped with an electric motor and an internal combustion engine. Especially with hybrid vehicles, but also with other vehicles, it is important for the driver to know the remaining driving range based on the current energy storage contents or the fuel quantity. Especially important for determining the residual driving range is the driving resistance of a vehicle, which is dependent on the number of occupants, the load, the type of the tires, and additional vehicle characteristics.

The exact knowledge of the driving resistance of a vehicle under different operating conditions can also be used for control tasks within the vehicle. For example, DE 10 2006 022 170 A1 discloses a method for determining the driving resistance of a vehicle wherein, in conjunction with an automatic transmission, driving resistance values are determined before the start of a gear shift and at a later time. If a change in driving resistance is detected in this context, the shifting operation can be corrected if necessary.

DE 601 13 226 T2 discloses a method for determining the driving resistance of a vehicle under the assumption of constant driving resistance coefficients and a predetermined vehicle mass. While driving, a threshold comparison is carried out which can be used to iteratively and more precisely determine driving resistance coefficients and the vehicle mass. However, only stored constants are used in these known methods to calculate the driving resistance at the beginning of the trip.

It is the object of the invention to provide a method for determining the driving resistance of a vehicle, which is capable of providing accurate information about the actual driving resistances and the mass of the vehicle at the beginning of the trip and while driving continues.

SUMMARY OF THE INVENTION

According to one aspect of the invention, the vehicle mass and driving resistance coefficients are estimated by using an estimation method before the trip begins, by taking into consideration sensor signals. This estimate is used to calculate an initial value of the driving resistance. A correction of the driving resistance is then calculated during the driving time based on successively measured driving values, so that the original driving resistance based on an estimate can be more accurately determined while driving. To determine these measured values while driving, there is no need to wait for acceleration or coasting operations; instead, consecutive measurements can be preformed at different driving speeds and can be used to calculate the driving resistance and the vehicle mass.

The vehicle mass and the driving resistance coefficients before the trip begins are estimated by using a mathematical simulation model, preferably by considering data that are already transmitted via a data bus to a control unit located in the vehicle. The method according to the invention can then be readily implemented directly in the controller. Moreover, information about the vehicle weight, including extra equipment, can be stored in the control unit, so that the mass of the vehicle can be more accurately estimated before each trip based on additional sensor information, for example on the actual fuel quantity of the gas tank and the seat occupancy. Load sensors and/or sensor signals used to control the headlight range may also be taken into consideration. Importantly, a constant value preset in the memory is not assumed for the vehicle mass at the beginning of the trip; instead, the vehicle mass is estimated from different signals transmitted via the CAN bus (data bus of the vehicle). An estimate of vehicle mass is particularly important because the vehicle mass has a significant effect on the driving resistance coefficient.

A generally valid equation for the driving resistance, which can also be referred to as the driving resistance force, is $F_w = F_0 + F_1 v + F_2 v^2$, wherein v is the speed of the vehicle, and $F_0$, $F_1$ and $F_2$ are driving resistance coefficients, which may also be referred to as roll-out coefficients. This $2^{nd}$-degree polynomial is suitable to approximate the driving resistance forces acting on a vehicle. The vehicle mass and the driving resistance coefficients $F_0$, $F_1$ and $F_2$ can now be calculated using the following measured values:

drive force $F_A$, road gradient resistance force $F_{ST}$, speed v, and acceleration a.

The invention will now be explained in more detail with reference to the drawing, which shows in:

BRIEF DESCRIPTION OF THE DRAWING

FIG. 1 illustrates how the driving resistance coefficient $F_0$, $F_1$ and $F_2$ and the vehicle mass m are estimated. The estimation is performed before the trip begins, whereas the unillustrated calculation is performed in a number of time-sequential measurements while driving.

DETAILED DESCRIPTION OF PREFERRED EMBODIMENTS

The estimation is performed by taking into consideration in a mathematical model for the vehicle's driving resistance various data and sensor information, such as ambient temperature, current fuel quantity, seat occupancy, ambient pressure, tire pressure, road gradient and the signal from a roof box sensor. These data and signals may be retrieved from a CAN data bus and/or a control unit CPU.

The mathematical model is based on the general equation for the driving resistance $F_w = F_0 + F_1 v + F_2 v^2$, wherein the driving resistance coefficients $F_0$, $F_1$ and $F_2$ depend on the vehicle mass and other operating parameters of the vehicle, for example of the drag coefficient $c_w$ and the frontal area $A_L$ of the vehicle.

Using a mathematical model, a simulation SIM can now be performed at different speeds, producing a curve for the driving resistance $F_w$ as a function of the speed, from which the driving resistance coefficients $F_0$, $F_1$ and $F_2$ to be calculated.

The following equation is assumed as a mathematical model for the driving resistance $F_{W,mod}$:

$$F_{W,mod} = F_0(X_0) + F_1(X_1)v + F_2(X_2)v^2 \quad \text{(Equation 1)}$$

"X" herein represents both vehicle data and environmental conditions, which may include, for example, relevant factors such as the drag coefficient and the frontal area of the vehicle, the vehicle mass, wheel diameter, tire type and temperature data, etc.

This mathematical model can be used to determine value pairs $(v_i, F_{W,i})$ for N different vehicle speeds $v_1 \ldots v_N$, which are entered into the following matrix equation:

$$\begin{bmatrix} 1 & v_1 & v_1^2 \\ 1 & v_2 & v_2^2 \\ \vdots & \vdots & \vdots \\ 1 & v_i & v_i^2 \\ \vdots & \vdots & \vdots \\ 1 & v_N & v_N^2 \end{bmatrix} * \begin{bmatrix} F_{0,EST} \\ F_{1,EST} \\ F_{2,EST} \end{bmatrix} = \begin{bmatrix} F_{W,1} \\ F_{W,2} \\ \vdots \\ F_{W,i} \\ \vdots \\ F_{W,N} \end{bmatrix} \quad \text{(Equation 2)}$$

The desired coefficients $F_{0,EST}$, $F_{1,EST}$ and $F_{2,EST}$ for $F_0$, $F_1$ and $F_2$, which are at least partially based on estimates, can then be determined by solving the matrix equation.

Figure 2:
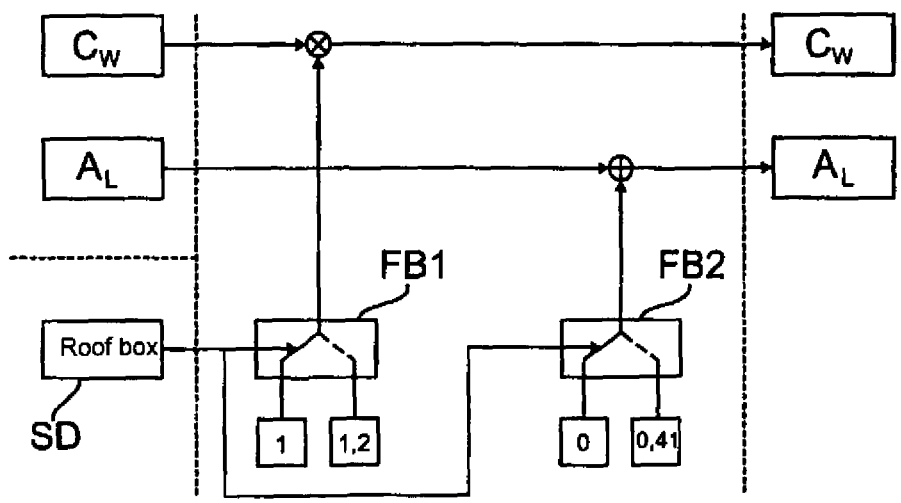

For a more precise determination of the air resistance used for the estimation process, the presence of a roof box can be detected with a roof box sensor SD before driving begins, as shown in FIG. 2, wherein the general factor of 1.2 is assigned to the drag coefficient $c_w$, representing an increase of 20%. Switching from the factor 1 to a factor 1.2 is indicated in the function block FB1 by a broken line.

In addition, when a roof box has been identified, the frontal area $A_L$ of the vehicle is increased in function block FB2 by 0.41 m², which is also indicated by a broken line.

Figure 3:
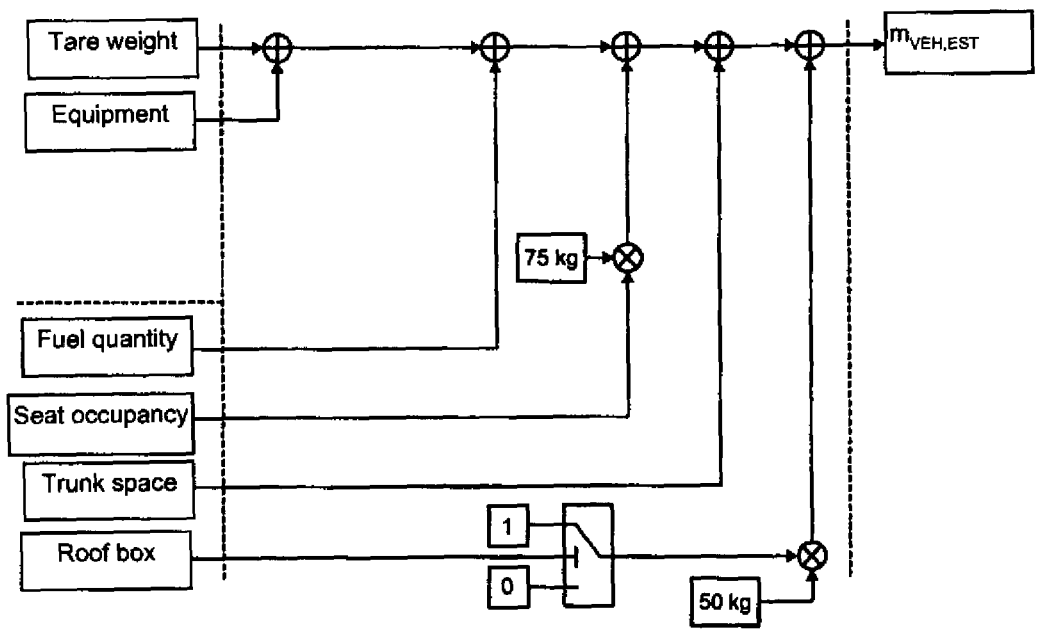

FIG. 3 shows in form of an exemplary functional block diagram how the vehicle mass is estimated before driving begins. The weight of the individual existing equipment items is added to the tare weight. The weight of the current fuel quantity is also added to the tare weight. Furthermore, the weight of the vehicle occupants is estimated by using seat occupancy sensors and is taken into account when determining the weight of the vehicle by assuming that each occupied seat in the illustrated embodiment adds an average weight of 75 kg. The presence of luggage in the trunk can also be taken into consideration by adding a weight supplement. Finally, a weight supplement of 50 kg is added when using a roof box, so that the sum of vehicle tare weight and the additional weight supplements figure in the determination of the estimated vehicle mass $M_{VEH,EST}$.

Figure 1:
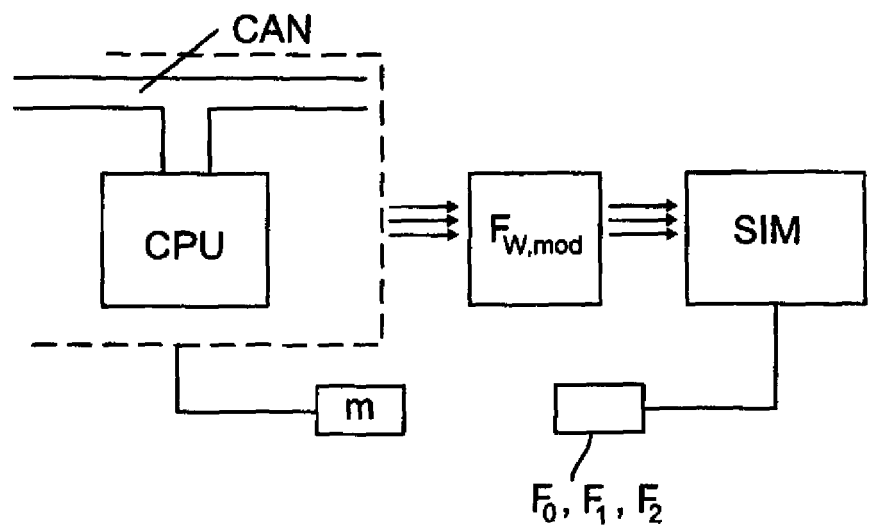
FIG. 1 schematically, a process flow of the various steps to estimate the vehicle mass and the driving resistance coefficients, FIG. 2 a functional block diagram for adjusting the air resistance coefficient in the presence of a roof box, and FIG. 3 a functional block diagram for estimating the vehicle mass before beginning the trip.

After the trip begins, the estimates determined according to the examples in FIG. 1 to FIG. 3 are replaced by calculated values derived from a plurality of measured driving values. The required measurements are mainly confined to the driving force $F_A$, the road gradient resistance force $F_{ST}$, the speed v and the acceleration a. Using the equation of motion $$\frac{dv}{dt} * m + F_0 + F_1 v + F_2 v^2 = \quad \text{(Equation 3)}$$
$$F_A - F_{ST} - \left( J_{MOT} \frac{i_G^2}{R_{WHEEL}^2} + J_{WHEEL} \frac{1}{R_{WHEEL}^2} \right) * \frac{dv}{dt},$$

the following matrix equation can now be set up for N measurement points:

$$\begin{bmatrix} a_1 & 1 & v_1 & v_1^2 \\ a_2 & 1 & v_2 & v_2^2 \\ \vdots & \vdots & \vdots & \vdots \\ a_i & 1 & v_i & v_i^2 \\ \vdots & \vdots & \vdots & \vdots \\ a_N & 1 & v_N & v_N^2 \end{bmatrix} \cdot \begin{bmatrix} m \\ F_0 \\ F_1 \\ F_2 \end{bmatrix} = \quad \text{(Equation 4)}$$

$$\begin{bmatrix} F_{A,1} - F_{ST,1} - \left( \frac{J_{MOT} \cdot i_G^2}{R_{WHEEL}^2} + \frac{J_{WHEEL}}{R_{WHEEL}^2} \right) \cdot a_1 \\ F_{A,2} - F_{ST,2} - \left( \frac{J_{MOT} \cdot i_G^2}{R_{WHEEL}^2} + \frac{J_{WHEEL}}{R_{WHEEL}^2} \right) \cdot a_2 \\ \vdots \\ F_{A,i} - F_{ST,i} - \left( \frac{J_{MOT} \cdot i_G^2}{R_{WHEEL}^2} + \frac{J_{WHEEL}}{R_{WHEEL}^2} \right) \cdot a_i \\ \vdots \\ F_{A,N} - F_{ST,N} - \left( \frac{J_{MOT} \cdot i_G^2}{R_{WHEEL}^2} + \frac{J_{WHEEL}}{R_{WHEEL}^2} \right) \cdot a_N \end{bmatrix}$$

wherein dv/dt is the acceleration a and $i_G$ represents the total gear ratio. $R_{WHEEL}$ is the radius of the wheels, $J_{MOT}$ is the motor inertia and $J_{WHEEL}$ is the combined mass inertia of the wheels, brakes and drive shafts.

With N representing the number of measurement points, the Equation 4 can be solved by the least-squares method, producing the desired calculated values for the vehicle mass m and the driving resistance coefficient $F_0$, $F_1$ and $F_2$. Once these calculated values are available, the previously determined estimated values are replaced before driving begins. The values can be continuously calculated while driving, wherein changing environmental effects, such as a wet or dry road surface, can also be taken into account.

What is claimed is:

1. A method of determining a driving resistance of a vehicle, wherein the driving resistance is calculated by taking into account a value of a vehicle mass, the method comprising:
    before driving begins, estimating the vehicle mass and driving resistance coefficients with an estimating method by taking into consideration sensor signals,
    determining from the estimated vehicle mass and the estimated driving resistance coefficients an initial value of the driving resistance,
    while driving, consecutively measuring driving-related values, and
    while driving, determining corrected values for the driving resistance and for the vehicle mass based on the measured driving-related values.

2. The method of claim 1, wherein before driving begins, the vehicle mass and the driving resistance coefficients are estimated with a mathematical simulation model by taking into account data that are transmitted via a data bus to a control unit disposed in the vehicle or data that are stored in a control unit.

3. The method of claim 2, wherein the sensor signals comprise data obtained from sensors selected from load sensors, temperature sensors, seat occupancy sensors, pressure sensors, moisture sensors and wheel sensors.

4. The method of claim 1, wherein vehicle-specific default values and correction values derived from the sensor signals are used in the estimation method for estimating the vehicle mass and the driving resistance coefficients.

5. The method of claim 1, wherein the measured driving-related values are values selected from a driving force, a road gradient resistance force, a speed and an acceleration.

6. The method of claim 5, wherein the corrected values for the vehicle mass and the driving resistance coefficients are calculated based on the measured driving-related values by using the following equation of motion:

$$\frac{dv}{dt} * m + F_0 + F_1 v + F_2 v^2 = F_A - F_{ST} - \left(J_{MOT} \frac{i_G^2}{R_{WHEEL}^2} + J_{WHEEL} \frac{1}{R_{WHEEL}^2}\right) * \frac{dv}{dt}$$

wherein $R_{WHEEL}$ is a radius of wheels, $J_{MOT}$ is a motor inertia, $J_{WHEEL}$ is a combined mass inertia of the wheels, brakes and drive shafts, and $i_G$ is a total gear ratio.

7. The method of claim 5, wherein the driving-related values are measured at different speeds, and the corrected values for the driving resistance coefficients and the vehicle mass are obtained by solving the following matrix equation with a least-squares method:

$$\begin{bmatrix} a_1 & 1 & v_1 & v_1^2 \\ a_2 & 1 & v_2 & v_2^2 \\ \vdots & \vdots & \vdots & \vdots \\ a_i & 1 & v_i & v_i^2 \\ \vdots & \vdots & \vdots & \vdots \\ a_N & 1 & v_N & v_N^2 \end{bmatrix} \cdot \begin{bmatrix} m \\ F_0 \\ F_1 \\ F_2 \end{bmatrix} = \begin{bmatrix} F_{A,1} - F_{ST,1} - \left(\frac{J_{MOT} \cdot i_G^2}{R_{WHEEL}^2} + \frac{J_{WHEEL}}{R_{WHEEL}^2}\right) \cdot a_1 \\ F_{A,2} - F_{ST,2} - \left(\frac{J_{MOT} \cdot i_G^2}{R_{WHEEL}^2} + \frac{J_{WHEEL}}{R_{WHEEL}^2}\right) \cdot a_2 \\ \vdots \\ F_{A,i} - F_{ST,i} - \left(\frac{J_{MOT} \cdot i_G^2}{R_{WHEEL}^2} + \frac{J_{WHEEL}}{R_{WHEEL}^2}\right) \cdot a_i \\ \vdots \\ F_{A,N} - F_{ST,N} - \left(\frac{J_{MOT} \cdot i_G^2}{R_{WHEEL}^2} + \frac{J_{WHEEL}}{R_{WHEEL}^2}\right) \cdot a_N \end{bmatrix}$$

wherein N is a total number of measurements, $a_i$, is an acceleration, $v_i$ is a speed, $F_{A,i}$ is the driving force, $F_{ST,i}$ is the road gradient force, $R_{WHEEL}$ is a radius of wheels, $J_{MOT}$ is a motor inertia, $J_{WHEEL}$ is a combined mass inertia of the wheels, brakes and drive shafts, and $i_G$ is a total gear ratio.

* * * * *